3,736,150
BEVERAGE CONTAINING EGG ALBUMEN
AND AMINO ACID
Jude A. Basso and Charles V. Fulger, Battle Creek, and Joseph J. Thompson, East Jordan, Mich., assignors to Kellogg Company, Battle Creek, Mich.
No Drawing. Continuation-in-part of application Ser. No. 801,141, Feb. 20, 1969. This application Aug. 4, 1971, Ser. No. 169,067
Int. Cl. A23l 1/00
U.S. Cl. 99—78
7 Claims

ABSTRACT OF THE DISCLOSURE

Egg albumen and an amino acid, such as glycine, are combined in the form of a water soluble powder. The powder is combined with other ingredients such as food acid, flavoring, and sweeteners to form a dry beverage mix in which the egg albumen and glycine are present as the major sources of protein. The proteinaceous beverage produced by hydrating the mix does not possess the characteristic egg flavor and odor of the albumen.

CROSS REFERENCE

This application is a continuation-in-part of our co-pending application Ser. No. 801,141, filed Feb. 20, 1969, now abandoned.

BACKGROUND OF THE INVENTION

This invention relates to a production of dry mixes containing egg albumen as the primary source of protein and more particularly to a totally water soluble admixture of egg albumen and amino acid, the solution of which at a predetermined pH range is free of the undesirable taste and aroma of eggs.

Various proposals have been made to utilize powdered egg albumen as a source of protein in dry beverage mixes, with the attendant difficulty of masking or removing the characteristic taste and odor of eggs. This difficulty is compounded if the albumen constitutes the primary source of protein and a major constitutent of the mix.

Others have proposed the addition of albumen and glycine to natural fruit juices, but the albumen additive has constituted only a small proportion of the total protein within the enriched product. For example, the patent to Block 2,919,195 discloses the addition of protein to natural orange juice, wherein a maximum of 20 percent of the protein may take the form of albumen, with the remainder of the protein consisting of egg yolk, glycine, and dry skim milk powder. The glycine is employed to peptize the proteins, especially the casein in the milk powder. Block did not have to cope with the problem of masking the characteristic flavor or odor because the albumen is sufficiently diluted by the bulk of the other proteins present as well as by the flavor and aroma of the natural orange juice. Moreover, in the case of beverage mixes that are to be reconstituted solely by the addition of water, it has been found that the presence of milk solids adversely affects the palatability and rehydration characteristics of the drink, irrespective of additions of glycine.

BRIEF SUMMARY OF THE INVENTION

In accordance with the presently described invention, we have discovered that the objectionable egg odor and taste may be effectively inhibited in fact eliminated, in beverages reconstituted with water from powdered mixes containing acid precipitated albumen as the primary source of protein, by adding relatively small proportions of an amino acid such as glycine to the mix, along with sufficient food acid to cause the pH of the resulting solution to fall within the range of between about 1.95 to 7, preferably about 1.95 to 4.0. The resulting enriched beverage is substantially indistinguishable organoleptically from a similar beverage with all protein omitted. Other ingredients typically included in the dry mix are sweetening, flavoring, coloring and clouding agents, whereby the reconstituted product will have a pleasant and palatable taste, appearance and aroma, as well as a high nutritional value. The mix may be rendered into a form that is instantly soluble in water and retains complete solubility in acidified solutions which simulate fruit or vegetable drinks. Moreover, the acidified solution is completely stable, whereas under the same conditions, most proteins would be denatured by the acid and would be precipitated out of solution.

DESCRIPTION OF THE PREFERRED EMBODIMENT

In accordance with the preferred embodiment of the invention, the egg albumen is preferably first subjected to acid treatment and converted to powder form by conventional methods. For example, the albumen may be provided in fresh, frozen or other suitable form and may be treated with a food acid such as citric, tartaric, fumaric, malic or the like, in an amount of from about 0.5% to about 10% by weight of the liquid mixture and adequate to provide a pH of from about 3.5 to about 4.5. The liquid mixture is stirred thoroughly to dissolve the food acid and cause the denaturation and precipitation of a fraction of the proteins in the liquid egg albumen. The denatured and precipitated fraction of the protein is then removed by suitable means such as centrifugation and the remaining soluble fraction of the protein recovered in a yield of approximately 88-90% by weight. This acid stabilized filtrate is then suitable dried under mild conditions such as by freeze drying, vacuum drying or spray drying to prevent further denaturation of the protein, and then pulverized if not already in such condition.

The dry soluble fraction of protein is then mixed with powdered or granulated amino acid and used to make food products such as acidified breakfast juice-type drinks. The treated dried albumen may be agglomerated with sucrose or other suitable polyhydroxy materials to facilitate more rapid dissolution in water.

An alternate and often preferable method of preparing the high protein composition is to dissolve or dispense one or more of the components of amino acid, food acid, or sucrose into the liquid acid stabilized albumen and then to dry the mixture.

In the practice of the present invention it has been found that the ratio between the amounts of albumen and amino acid is critical to the extent that the proportion of amino acid must be above a defined minimum in order to effectively inhibit the egg taste and odor. If the total protein components are to be supplied by albumen and an amino acid such as glycine, the glycine commences to impart its inhibiting characteristic at a level of about 3% by weight of the protein mixture, and at 4.75% achieves satisfactory effectiveness. Proportions of amino acid above about 5% have not been found to be contributing greater organoleptic effectiveness, but amounts up to 33% may be employed without adversely affecting the desirable characteristics of the product. In the range over 6% the amino acid is employed principally to adjust the amount of protein to be contributed by the albumen.

For the sake of brevity, the term "protein" will be deemed to include both natural protein as well as the amino acids specified herein, since all may be considered as proteinaceous components from a nutritional viewpoint.

It is theorized that particular amino acids, when present above a given minimum level and within certain ranges of acidity, tend to tie up or otherwise combine with chemical groups in the albumen, such as sulfhydryl groups, thought to be responsible for the characteristic odor and taste of eggs, and thereupon eliminate or take away such odor and taste.

It has also been found that the dry product must be reconstituted within a particular range of acidity in order that the egg taste and odor will be effectively inhibited. The acidity of the reconstituted beverage is preferably maintained within a pH range of 1.95 to 4.0, although some degree of inhibition is achieved throughout the pH range between 1.95 and 7.0. Therefore, a sufficient amount of solid food acid is preferably incorporated into the protein mixture to assure that the water reconstituted product will attain a pH within the specified range.

The following is a general formula for a dry mix that may be reconstituted by the addition of water into a breakfast juice-type drink.

Ingredients: Percent by weight
Protein (17–42%)—
    Dry acid stabilized albumen _____ 15–40
    Amino acid _____ 2–18
Food acid _____ 1–2
Sucrose _____ 30–43
Flavor _____ 0.5–1.4
Color _____ 0.01–0.02
Clouding agent _____ 1–2

The above composition is prepared either by mixing the above separate ingredients together or by co-drying liquid acid stabilized albumen with one or more of the amino acid, food acid or sucrose and adding the remainder of the ingredients. The resulting mixture may be prepared with or without the addition of suitable wetting and antifoaming agents and dried to the desired moisture level.

In order to prepare a beverage for consumption, the dry mix is added to and dissolved in water and diluted such that the mix constitutes, typically, 15 to 30 percent by weight of the solution. The resultant mix is soluble in water and may be rendered more readily soluble if desired by agglomerating the mixture into porous aggregates.

Although sucrose is the preferred sweetening agent, other natural or artificial agents may be employed, such as glucose, or sodium or calcium saccharine or their mixtures. Flavoring agents may be such as orange, grapefruit, pineapple, tomato, raspberry or other flavors, and, if desired, flavor enhancing agents such as salt may also be added. Other appropriate additives may include natural dried food pulps, fortifiers such as vitamins and minerals, antifoaming agents, and the like.

Substitutes for the amino acid glycine can be others such as tyrosine, alanine, L-leucine, lysine, isoleucine, arginine, methionine, L-cystine, 4-hydroxy-L-proline, valine, D–L proline, glutathione and various polypeptides.

For the purpose of inhibition of egg flavor and odor, it has been found that L-cystine is slightly more effective than glycine and may be added in slightly lower proportions; glycine is preferred, however, because it is less expensive and has a better acceptance history in foods.

For the purpose of illustration, the following is a specific example of use of the present invention in the preparation of a breakfast type food drink:

Thirty pounds of fresh liquid egg albumen was stirred thoroughly for 30 minutes with 210 grams of anhydrous citric acid. The product was then centrifuged and the precipitated protein fraction of 12% by weight discarded. The remaining soluble fraction was poured in flat trays, frozen and freeze-dried. The treated dried protein was then used in the following formulas to prepare mixes for the preparation of beverages:

| Ingredients | Sample No. 1 [a] (percentages) | Sample No. 2 [b] (percentages) |
|---|---|---|
| Egg albumen | 42.2 | 35.33 |
| Glycine | 2.0 | 17.67 |
| Sucrose | 50.42 | 42.40 |
| Fumaric acid | 1.05 | 0.88 |
| Orange flavor | 1.47 | 1.23 |
| Color | 0.02 | 0.02 |
| Clouding agent | 2.00 | 1.77 |
| Defoaming agent | 0.84 | 0.70 |

[a] Total formula weight, 47.6 grams.
[b] Total formula weight, 56.6 grams.

The above two samples were each mixed with about 235 ml. of cold water to yield orange breakfast drinks each containing approximately 2 grams of egg albumen per liquid ounce. Sample No. 1 exhibited a pH of about 3.8, and Sample No. 2 exhibited a pH of about 4.0. The samples were subjected to taste tests and were found to have no objectionable egg flavor or odor.

We claim:

1. A wholly water soluble proteinaceous food additive consisting essentially of a mixture of egg albumen and an added amino acid in the form of a storage stable powder having when dissolved a pH in the order of about 1.95 to 7, the amino acid being added to the egg albumen at a level in excess of about 3% but not in excess of about 33% of the mixture of the two to effectively inhibit the characteristic egg flavor and odor of the albumen.

2. The product of claim 1 wherein the amino acid is glycine.

3. A dry beverage mix totally reconstitutable by water comprising protein and food acid, said protein comprising a major proportion of water soluble egg albumen and glycine which are present as the major sources of protein in the mix, the glycine constituting at least about 3% and up to 33% of the protein mixture, and said food acid being added to said mixture in an amount sufficient to cause the water reconstituted beverage to exhibit a pH within the range of about from 1.95 to 7.0, and wherein said egg albumen is present in sufficient quantities such that the reconstituted beverage contains in excess of one gram per fluid ounce of egg albumen.

4. The beverage mix of claim 3 wherein said mixture additionally contains flavoring and sweetening agents.

5. The dry beverage mix of claim 3 wherein the glycine constitutes from about 4% to 6% of the protein mixture.

6. A storage stable dry beverage mix containing high protein content, said mix being reconstituted by the addition of water and comprising water soluble protein, a sweetening agent, a food acid, color and flavor, said protein consisting essentially of a mixture of acid precipitated egg albumen and one or more amino acids selected from the group consisting of glycine, tyrosine, alanine, L-leucine, lysine, isoleucine, arginine, methionine, L-cystine, 4-hydroxyl-L-proline, valine, D-L proline, glutathione or a polypeptide, said amino acid constituting at least about 4.75% of the total protein, and said food acid being present in an amount sufficient to cause the reconstituted beverage to exhibit a pH within the range of about from 1.95 to 4.0.

7. A high protein content beverage comprising water, food acid, sweetener, flavor and protein components, said protein components consisting essentially of egg albumen and an amino acid, said beverage having a pH of from about 1.95 to about 7, said amino acid constituting at least about 3% and up to 33% of the weight of protein components and effectively inhibiting the characteristic egg flavor and odor of the albumen.

References Cited

UNITED STATES PATENTS

| | | | |
|---|---|---|---|
| 2,919,195 | 12/1959 | Block | 99—105 |
| 2,127,945 | 8/1938 | Tranin | 99—113 |
| 2,166,070 | 7/1939 | Littlefield | 99—113 |
| 3,170,804 | 2/1965 | Kline et al. | 99—210 |
| 2,518,233 | 8/1950 | Hall | 99—161 |

FOREIGN PATENTS

| | | |
|---|---|---|
| 602,572 | 8/1960 | Canada. |
| 551,827 | 3/1943 | Great Britain. |

OTHER REFERENCES

Greenberg: Amino Acids and Proteins, 1951, page 30.

MORRIS O. WOLK, Primary Examiner

S. B. DAVIS, Assistant Examiner

U.S. Cl. X.R.

99—14, 28, 113